United States Patent [19]

Jaki

[11] Patent Number: 4,590,334
[45] Date of Patent: May 20, 1986

[54] SUPPLY CIRCUIT INCLUDED IN A DC-MAGNETIZED HYBRID TRANSFORMER

[75] Inventor: Ivan Jaki, Norsborg, Sweden

[73] Assignee: Telefonaktiebolaget LM Ericsson, Stockholm, Sweden

[21] Appl. No.: 556,243

[22] PCT Filed: Mar. 22, 1983

[86] PCT No.: PCT/SE83/00101
§ 371 Date: Nov. 8, 1983
§ 102(e) Date: Nov. 8, 1983

[87] PCT Pub. No.: WO83/03504
PCT Pub. Date: Oct. 13, 1983

[30] Foreign Application Priority Data
Apr. 1, 1982 [SE] Sweden .................. 8202104

[51] Int. Cl.$^4$ .................. H04B 3/30; H04B 1/52
[52] U.S. Cl. .................. 179/170 D
[58] Field of Search .......... 179/170 D, 170 R, 16 A, 179/16 AA, 16 E, 16 EC, 170 J; 336/155

[56] References Cited

U.S. PATENT DOCUMENTS

| | | | |
|---|---|---|---|
| 3,778,563 | 12/1973 | Bise et al. | 179/170 R |
| 3,875,350 | 4/1975 | Fischer | 179/170 D |
| 3,911,372 | 10/1975 | Seidel | 179/170 R X |
| 3,987,257 | 10/1976 | Place | 179/170 NC |
| 4,297,536 | 10/1981 | Buchner | 179/170 D |
| 4,336,423 | 6/1982 | Morlec et al. | 179/170 D X |

FOREIGN PATENT DOCUMENTS

| | | |
|---|---|---|
| 2450853 | 4/1975 | Fed. Rep. of Germany . |
| 1604188 | 9/1971 | France . |
| 2235555 | 1/1975 | France . |

*Primary Examiner*—James L. Dwyer
*Attorney, Agent, or Firm*—Roberts, Spiecens & Cohen

[57] ABSTRACT

A supply circuit for a two-wire line is included in a DC-magnetized hybrid transformer in which the two primary windings ($1_1$, $1_2$, $1_1'$, $1_2'$) are magnetically coupled to two pairs of secondary windings ($1_3$, $1_4$). The primary winding is divided into two parts to form an auto transformer and the supply circuit ($E_o$, $R_{1b}$, $R_{2b}$) is connected to the common connection points of the parts. The supply circuit includes two resistor networks which each consists of a PTC-resistor ($R_{p1}$, $R_{p2}$) in parallel with a temperature dependent resistor ($R_1$, $R_2$) to limit the feed current at varying line length.

4 Claims, 9 Drawing Figures

SUPPLY CIRCUIT INCLUDED IN A DC-MAGNETIZED HYBRID TRANSFORMER

TECHNICAL FIELD

The present invention relates to a supply circuit included in a telephone repeater connected between a two-wire line and the repeater to provide a transfer between the two-wire and four-wire circuits in the repeater. More fully, the invention relates to a supply circuit in such repeaters, used to transform the analogue telephone signals coming from the line, into PCM-coded signals and vice versa.

BACKGROUND ART

When converting analogue telephone signals from a certain subscriber via a certain line, repeaters are used to provide two different signal paths. In one of these paths the analogue signals are coded to the PCM-coded signals and in the other a decoding of the digital PCM-coded signal flow is carried out. Furthermore, amplifiers are connected to compensate for the attenuation of the line. It is previously known to use a direct current magnetized hybrid transformer when dividing the input of the repeater towards the two-line, the transformer giving the desired current feeding to the subscriber's set connected to the line. At the same time, however, a DC-magnetizing of the transformer core is obtained.

DISCLOSURE OF THE INVENTION

When constructing transformer hybrids included in repeaters, certain demands are made regarding the design of the hybrid and consideration must be taken to the DC-magnetizing of the transformer. Firstly the input terminals towards the two-wire side should be balanced to an earth point, since otherwise the so called longitudinal currents arise across the line. Furthermore the transformer hybrid should fulfill the acoustic feedback attenuation demands on the four-wire side for the line impedance of the actual two-wire side. Operation attenuation distortion in the speech band should be low (for example, $A_d < 0.5$ dB). Finally the echo attenuation on the two-wire side has to be high for impedances i.e. line and subscriber's set impedances which are connected to the two-wire side of the hybrid. Otherwise reflections arise across the line between the hybrid and the subscriber's set.

In addition there will be problems with a DC-magnetized hybrid transformer to prevent incoming speech voltage from being short-circuited via the current loop through which direct current is supplied from the battery towards the line. Previously current supply has been carried out across a mid point capacitor $C_o$ or a choke D has been connected in series with the DC-voltage source, see appended FIGS. 2 and 3, respectively.

The DC-premagnetizing of some of the windings $1, 1'$ is defined according to $$L.I_o^2/V_{Fe} = 12.57 \cdot 10^{-9} \mu rev . H_o^2 \qquad (1)$$

where
L = Inductance of the windings,
$I_o$ = premagnetizing current,
$V_{fe}$ = core volume.

According to equation (1), previously known current feed alternatives demand according to FIGS. 2 and 3 large core volume of the hybrid transformer and the choke, respectively, especially if the feed current $I_o$ is high. Higher feed current also imply several other problems:

(a) The temperature in the transformer windings increases according to $$T = T(P), P = I_o^2 R_k \qquad (2)$$

$R_k$ = Copper resistivity of the windings $1, 1'$.

(b) In particular a temperature increase $T_M$ is obtained in the box where the feed resistors $R_{1b}$ and $R_{2b}$ are placed according to $$T_m = T_m(P), P = I_o^2(R_{1b} + R_{2b} + R_k) \qquad (3)$$

This implies a more rapid ageing of the components, in particular the ageing of the current feed resistors $R_{1b}$ and $R_{2b}$ is critical.

(c) At a low-ohmic current feed alternative the current feed resistors $R_{1b}$ and $R_{2b}$ are low. At overvoltages, for example, upon lightning, the energy of the thunder increases according to $$W = U^2/R_{b1}.R_{b2} \qquad (4)$$

(d) In the known current feed principles according to FIGS. 2, 3 and 4 it is particularly difficult to attain a high echo attenuation $A_e$ for low frequencies if the current feed resistors $R_{1b}, R_{2b}$ are low.

According to the invention the above mentioned problems are solved, on the one hand by transforming the feed resistance $R_{1b}, R_{2b}$ and, on the other hand by a special current limitation by means of PTC-resistors.

BRIEF DESCRIPTION OF DRAWINGS

The invention will be more fully described in the light of prior art with reference to the accompanying drawings, where.

EMBODIMENTS

Figure 1:
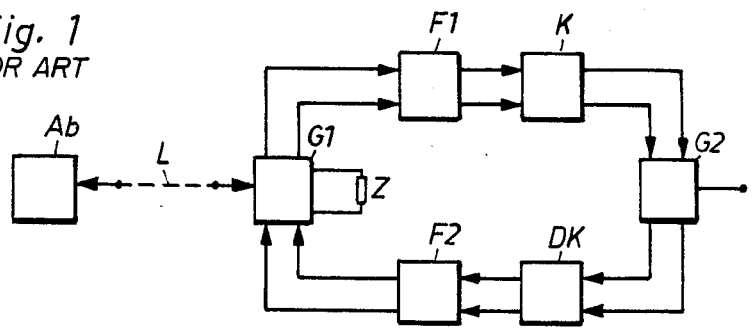
FIG. 1 shows a block diagram of a telephone repeater and its connection to a subscriber via a two-wire line.
Figure 2:
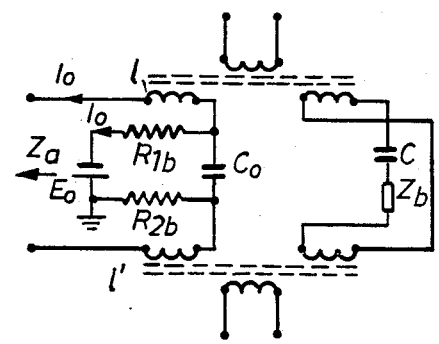
FIGS. 2, 3 and 4 show three different embodiments of a hybrid transformer of known kind.
Figure 3:
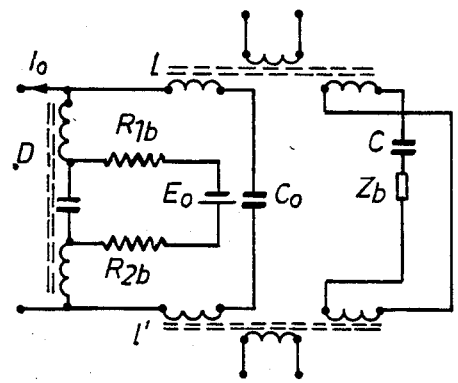
Figure 4:
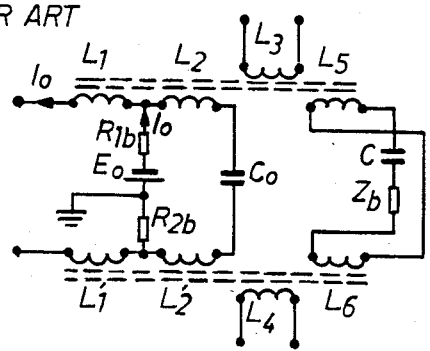

FIGS. 2, 3 and 4 show the circuit diagram of previously known embodiments of the hybrid coupling circuit G1 in FIG. 1 as described in the Swedish application No. 8102610-6. In the embodiment according to FIG. 2 two windings $1, 1'$ of the hybrid transformer are from a voltage source $E_o$, connected to each terminal of the winding via the resistors $R_{1b}, R_{2b}$. This hybrid structure can be used if the DC-current $I_o$ is low and if the value of the feed resistors $R_{1b}$ and $R_{2b}$ are essentially higher than the impedance of the center point capacitor $C_o$ at the lowest frequencies in the passband, i.e.

$$R_b > 1/\omega C_o \qquad (5)$$

In another alternative according to FIG. 3 the supply voltage source $E_o$ is connected in series and between two different windings of a choke D. The coupling according to FIG. 3 is more advantageous and simpler to dimension. However, the choke D demands a large volume if it is realized with passive components. The embodiment according to FIG. 3 can as a whole not be used if the mechanical construction of the circuit card demands limited mounting height just dependent on the choke D.

The hybrid embodiment according to FIG. 4 has several advantages as compared with FIGS. 2 and 3. These advantages are extensively described in the above mentioned Swedish patent application.

Figure 5:
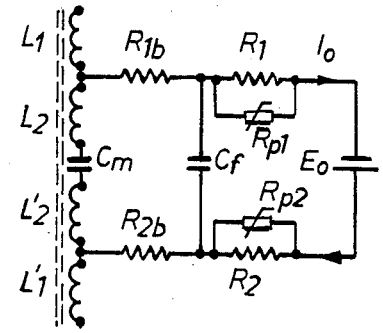
FIG. 5 shows a circuit diagram of a current limiter with an autotransformer according to the invention.

In FIG. 5 this is shown a further embodiment of a hybrid transformer according to the invention. In series with the voltage feed source $E_o$ which in the first place should supply a subscriber with DC-current, a first and a second parallel circuit of resistors are connected. Each parallel circuit consists of a PTC-resistor $R_{p1}$ and $R_{p2}$, respectively and a resistor R1 and R2, respectively. In parallel with this structure a capacitor $C_f$ is connected. To each side to the capacitor $C_f$ feed resistors $R_{1b}, R_{2b}$ are connected. The other sides of resistors $R_{1b}$ and $R_{2b}$ are connected to the respective terminal between the windings $L_1, L_2$ and $L_{1'}, L_{2'}$, respectively of a balanced auto transformer. This transformer corresponds to the autotransformer $L_1, L_2$ and $L_{1'}, L_{2'}$ in FIG. 4 and includes like this transformer a capacitor $C_m$ (corresponding to the capacitor $C_o$), to divide the transformer into two winding halves. The capacitor $C_f$ operates as an AC short-circuiting for the speech signals, the resistors $R_{1b}, R_{2b}$ defining the resistance which is seen from the two-wire side. It is important that the speech currents are disconnected from the PTC-resistors $R_{p1}, R_{p2}$ since these do not have any well defined resistance and, in addition, great tolerances.

According to the invention a feed circuit is connected to the hybrid transformer including, apart from the voltage feed source and the current feed resistors, also PTC-resistors to attain essentially the same current feed to near as well as to remotely located subscribers. There is a strong interest that the current feed resistors should be low to supply also the most remote telephone subscribers with required feed current $I_o$. In addition, it is prescribed that the current $I_o$ should exceed a certain value ($I_o \geq 23$ mA). If the feed current$=I_o, R_o=$the internal resistance of the subscribers set, $R_1=$the line resistance (proportional to the line length) it is obtained:

$$I_o = E_o/R_o + R_1 + R_b \quad (6)$$

Where $R_b$ is the resistance of the resistor network according to FIG. 5, i.e.

$$R_b + R_{1b} + R_{2b} + R_1 \cdot R_{p1}/R_1 + R_{p1} + R_2 \cdot R_{p2}/R_2 + R_{p2}.$$

Figure 8:
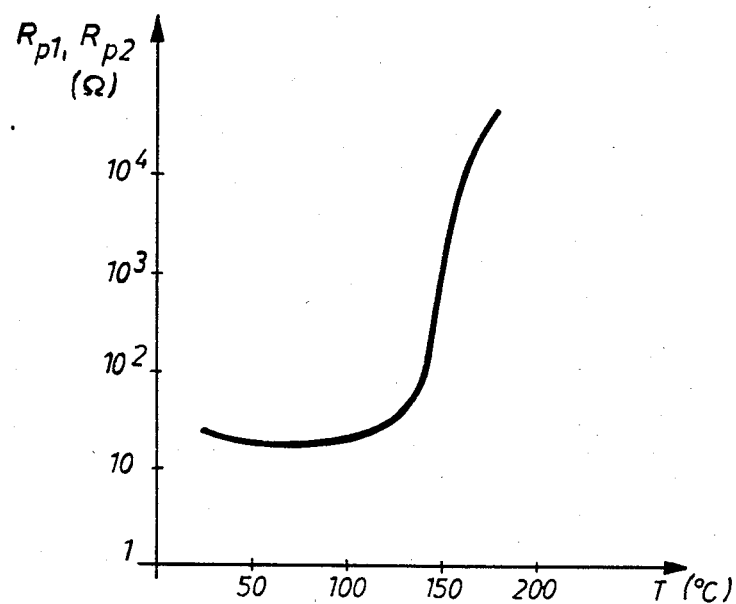
FIG. 8 shows the variation of the feed current $I_o$ as a function of the line length and how the feed resistance varies with the line length.
Figure 9:
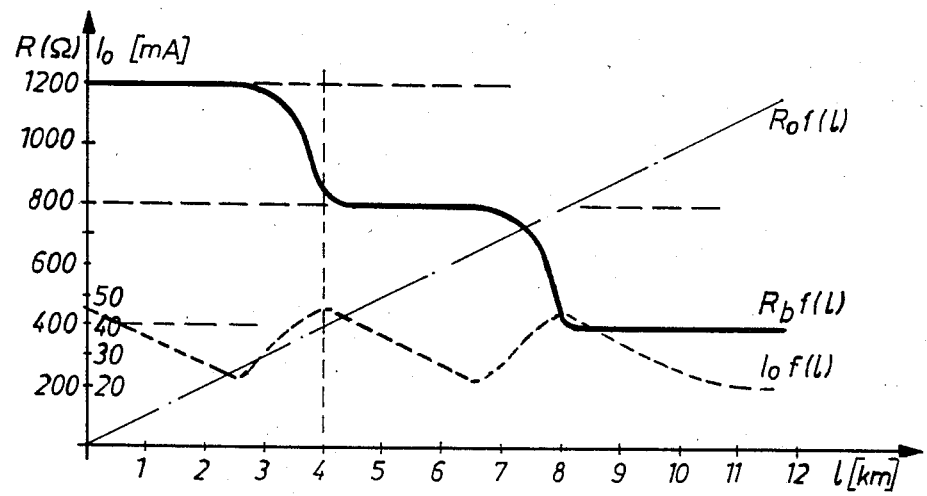
FIG. 9 shows the characteristics of a PTC-resistor.

From the relation (6) above it is seen that the line resistance $R_1$ can increase with the value with which the feed resistance decreases when the feed current $I_o$ is unchanged. Problems however arises at low feed resistance in the case when a subscriber is located near the hybrid transformer (the repeater), since also the line resistance $R_1$ then is low. At a feed resistance $2\times 200$ ohm the feed current $I_o$ varies between 115–23 mA due to the distance of the subscriber to the repeater. At low line resistance $R_1$ the feed current $I_o$ tends to be high. A high feed current $I_o$, however, implies in the circuit according to FIG. 5 that the resistance of the PTC-resistors increases which implies that the current $I_o$ decreases. When the line length increases for a remote subscriber, the feed current tends to decrease. This implies that the power across PTC-resistors decreases and their resistance decrease. FIG. 9 shows schemically that the resistance of a PTC-resistor "switches" from a low to a high value when a certain winding temperature $T_o$ is exceeded, i.e. when the power due to the feed current $I_o$ is exceeded. FIG. 8 shows in a diagram the resistance $R_b$ according to the above, the sum $R_o$ of the subscribers resistance (the set resistance) and the line resistance and the variation of the feed current with the line length. According to the invention the feed resistors $R_b$ is approximately inversely proportional to the resistance of the load, i.e. for example the feed resistance is 400 ohm of a remote subscriber, at a mean distance 800 ohm and of a close subscriber 1200 ohm. The transfer to different feed resistance values is continous according to FIG. 8 and is automatically controlled by the feed current $I_o$. If the feed current $I_o$ exceeds a certain value, for example $I_o \geq 45$ mA, one of the PTC-resistors is transferred according to FIG. 9 to a high-ohmic state and vice versa when the current $I_o$ decreases below such value.

Figure 6:
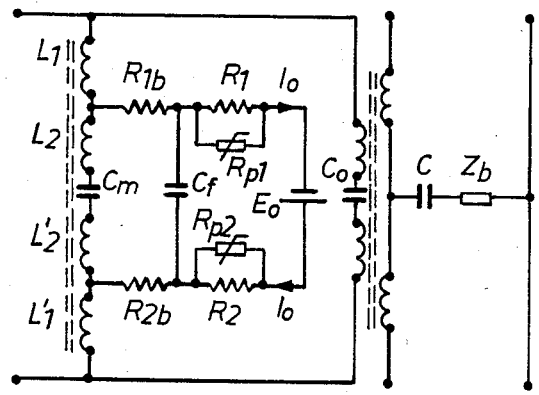
FIGS. 6 and 7 show two hybrid structures in which the inventive principle is applied.
Figure 7:
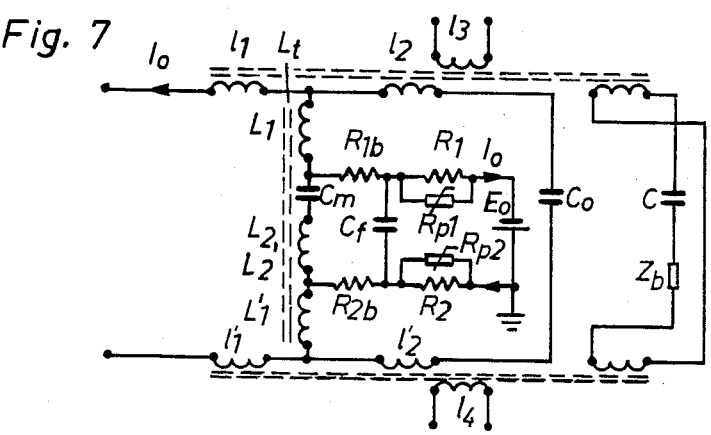

FIGS. 6 and 7 show how the current feed circuit according to the invention is applied at two different embodiments of a hybrid transformer. In FIG. 6 the feed circuit is connected directly to the two-wire side via an auto transformer $L_t$ with the center point capacitor $C_m$. The feed resistance $R_b$ is then transformed to a higher value $R_b'$, where $$R_b' = R_b(n_1 + n_2/n_1)^2$$

in accordance with the principle according to FIG. 4.

In the embodiment according to FIG. 7 the feed circuit is connected to the two-wire side in two stages on the one hand via the auto transformer $L_t$ and on the other hand via the auto transformer $L_1, L_2, L_{1'}, L_{2'}$, c.f. FIG. 4, assuming that the number of turns and the ratio in the transformers are equal, it is in this case obtained the feed resistance $$R_b' = R_b(n_1 + n_2/n_1)^4$$

A transformed feed resistance implies a lower attenuation between the two-and four-wire side and vice versa and a higher echo attenuation on the two-wire side. At the same time as regards for DC a low ohmic character of the feed source is obtained. The advantages which is attained with the feed circuit according to the invention in combination with an auto transformer is primarily:

Less operational attenuation distortion within the speech band at low frequencies.

Upon a suitable dimensioning of the capacitor $C_m$ and the auto transformer $L_t$ the operational attenuation increases for the frequencies 150–100 Hz.

The thunder effect will be advantageously contributed for all hybrid components, especially the capacitor $C_o$ will have a low thunder voltage.

I claim:

1. A supply circuit for a DC-magnetized hybrid transformer connected between two and four wire lines said transformer having two winding sections which are AC-coupled and each having a supply terminal, said supply circuit comprising a current supply having first and second output terminals, and first and second resistance means coupling one of said output terminals to one of said supply terminals respectively, each of said resistance means comprising a current-feed resistor serially connected to a resistor network including a PTC-resistor.

2. The supply circuit of claim 1 wherein each resistor network further includes a resistor in parallel with the PTC-resistor.

3. The supply network of claim 1 further comprising a speech signal shunting capacitor interconnecting the junctions of the current feed resistor and the resistor networks in each resistance means.

4. The supply circuit of claim 3 wherein each resistor network further includes a resistor in parallel with the PTC-resistor.

* * * * *